UNITED STATES PATENT OFFICE.

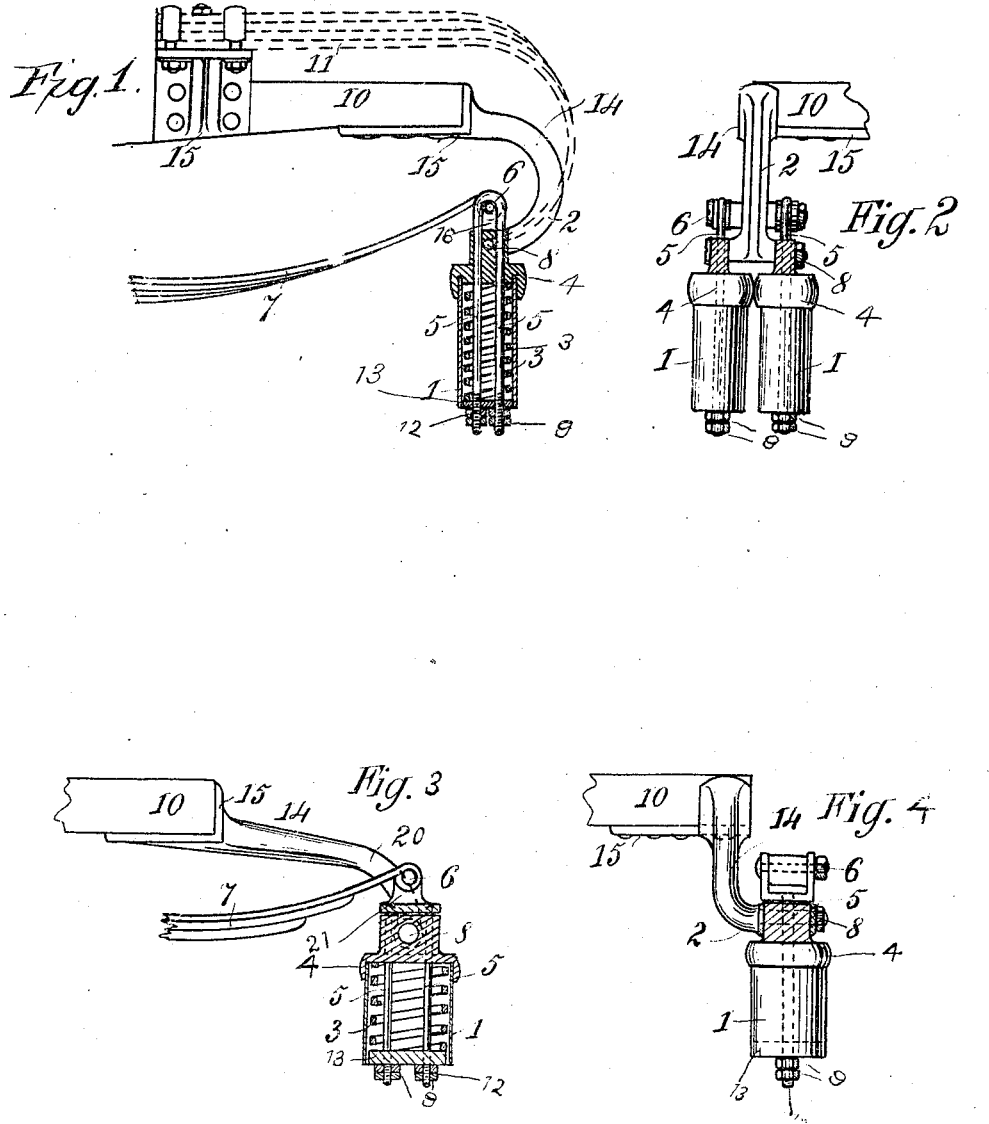

LOUIS PAUL CONSTANT JULES JACQUET, OF NEUILLY-SUR-SEINE, NEAR PARIS, FRANCE, ASSIGNOR TO THE J. M. SHOCK ABSORBER COMPANY, A CORPORATION OF PENNSYLVANIA.

SUSPENSION-SPRING FOR VEHICLES.

1,015,682.

Specification of Letters Patent. Patented Jan. 23, 1912.

Application filed October 21, 1910. Serial No. 588,344.

*To all whom it may concern:*

Be it known that I, LOUIS PAUL CONSTANT JULES JACQUET, a citizen of the Republic of France, residing at 5 Boulevard de la Seine, Neuilly-sur-Seine, near Paris, France, have invented certain new and useful Improvements in or Relating to the Suspension-Springs for Vehicles, of which the following is a specification, reference being had therein to the accompanying drawing.

This invention relates to an elastic spring support for motor cars and other vehicles adapted to resiliently connect the frame of the vehicle to the spring proper, and has for its object to produce a shock absorber or deadener, which will be simple in construction, certain in action, comparatively inexpensive to manufacture, and one which may be readily adjusted and substituted for the usual hangers on the various kinds of vehicles now in use, without it being necessary to modify any piece or portion of the mechanism now employed, or to make a single hole or any other change in said hanger mechanism.

With these and other objects in view, the invention consists in the novel details of construction and combinations of parts more fully hereinafter disclosed and particularly pointed out in the claims.

Referring to the accompanying drawings forming a part of this specification in which like numerals designate like parts in all of the views:—Figure 1 is a front elevational view partly in section of a shock absorber comprising double spring boxes made in accordance with my invention, and which may be readily substituted for the various hangers now employed on vehicles in general; Fig. 2 is a side elevational view partly in section, of the parts shown in Fig. 1; Fig. 3 is a front elevational view partly in section of a slightly modified construction adapted for French cars, in which a rigid rod projects from the frame; and, Fig. 4 is a side elevational view also partly in section of the elements shown in Fig. 3.

Referring more particularly to Figs. 1 and 2, my elastic spring support, or shock absorber, comprises a plurality of cylinders or boxes 1, each provided with a closed head 4, through which passes the bolt or pin 8 of the hanger member 2 supported from the body of the car. Inclosed in said boxes or cases 1, are springs 3 preferably helical in form, and supporting each spring is a U-shaped rod 5, screw-threaded at its ends 12, and provided with the nuts 9, adapted to support a disk 13 upon which the lower ends of said springs 3 rest. The upper or loop portion of said rods 5 pass over the bolt 6 of the flat vehicle spring 7, while the bolt 8 is straddled by said rods and a space 16 is provided between the top of said head 4 and said bolt 6, as shown.

It results from the contsruction now disclosed, that any weight which may be transmitted by the member 2 to the bolt 8, will tend to depress the heads 4, casings 1 and springs 3. These latter in turn will cause pressure to be transmitted to the nuts 9 and bolt 6, thereby connecting the member 2 with the spring 7 by a resilient shock absorbing device. It will also be observed that the head 4 is provided with an upwardly extending portion to receive the bolt 8 and that the rods 5 pass through this extension as well as through the head proper, thereby being provided with long bearings capable of steadying the reciprocating movements of said rods, while the said casing is free to oscillate around both the bolts 6 and 8 owing to the space 16. It, therefore, follows that substantially all strains will be directed longitudinally of the casings 1 no matter in what positions said casings may be found. Consequently, there will be little tendency for lateral wear in the said long bearings, and the rods 5 will reciprocate with great smoothness and certainty. This is an important feature of my invention, for it not only lengthens the life of my absorber, but also saves the car.

In addition to the above, the bottom of the casings being open, when a car body of one weight is substituted for one of a different weight, it is a simple matter to remove the nuts 9, take out the springs 3 and substitute springs of the required dimensions for the new body. The same facility obtains in the case of a broken spring when it is desired to renew it. A still further advantage occurs in the case of broken springs when enroute and no new spring is to be had. In such case the nuts 9 may be quickly screwed up until the two broken convolutions rest firmly upon each other, when the journey may be then resumed with the unbroken convolutions taking their share of the work, and thereby preventing the other unbroken spring 3 from being destroyed by an overload.

Another most important feature of my invention resides in its capability of being placed on almost any make of car. That is to say, the extreme ends of the members 2 and springs 7 through which the bolts 8 and 6 respectively pass, vary in width on different makes of car. By mounting the casings 1 entirely independent, however, I can readily place them in position no matter what the dimensions of these parts may be, by simply lengthening or shortening the said bolts 6 and 8. In other words, my shock absorber can be readily placed on almost any type of car in a few minutes without boring any holes, or cutting any parts whatever, even though the hanger elements may widely vary.

In Figs. 3 and 4 I have shown a construction of shock absorber especially adapted for French cars, which are usually provided with a rigid rod 20 of the general shape shown, supported from the chassis 10. I prefer in this modification to employ a single casing 1, and to connect the rods 5 with a U-shaped piece 21 which receives the bolt 6 of the spring 7 as illustrated. Otherwise, the structure is the same as in Figs. 1 and 2. 14 in all the figures shows a convenient means for connecting the hanger member 2 or 20 to the chassis.

What I claim is:—

1. In an elastic spring support the combination of a hanger member; a bolt carried by said member; a casing closed at one end with a head through which said bolt passes and open at the other end; a spring in said casing; a U-shaped rod supporting said spring at its open end, and passing through said head near its looped end; a second bolt passing through said looped end; and a vehicle spring carrying said second bolt, substantially as described.

2. In an elastic spring support the combination of a hanger member; a bolt carried by said member; a casing closed at one end with a head provided with an extension through which said bolt passes and open at the other end; a spring in said casing; a U-shaped rod and disk supporting said spring at its open end, and said rod passing through said head and extension near its looped end; a second bolt passing through said looped end leaving a space between said second bolt and extension; and a vehicle spring carrying said second bolt, substantially as described.

3. In an elastic spring support for vehicles, the combination of a hanger member; a bolt carried by said member; a plurality of casings each closed at one end by a head through each of which said bolt passes, and open at their other ends; a spring in each casing; a U-shaped rod in each casing supporting said springs, and passing through said heads near their looped ends; a second bolt passing through the looped ends of each of the U-shaped rods; and a vehicle spring carrying said second bolt, substantially as described.

4. In an elastic spring support for vehicles, the combination of a hanger member; a bolt carried by said member; a plurality of casings each closed at one end by a head having an extension through each of which said bolt passes, and open at their other ends; a helical spring in each casing; a U-shaped rod in each casing provided with nuts supporting said springs, and passing through said heads and extensions near their looped ends; a second bolt passing through the looped ends of each of the U-shaped rods; and a vehicle spring carrying said second bolt, substantially as described.

5. In an elastic spring support the combination of a hanger member; a bolt carried by said member; a casing closed at one end with a head through which said bolt passes; a spring in said casing; rod members supporting said spring, and passing through said head; a yoke attached to said rod members; a second bolt passing through said yoke; and a vehicle spring carrying said second bolt, substantially as described.

In testimony whereof I affix my signature in the presence of two witnesses.

LOUIS PAUL CONSTANT JULES JACQUET.

Witnesses:
PAUL FOLLIN,
CHARLES BLONDEL.

---

Copies of this patent may be obtained for five cents each, by addressing the "Commissioner of Patents, Washington, D. C."